United States Patent
Sridhara et al.

(10) Patent No.: US 8,781,404 B2
(45) Date of Patent: Jul. 15, 2014

(54) PORTABLE ELECTRONIC DEVICE POSITIONING BASED ON MULTIPATH CHARACTERIZATION INFORMATION ASSOCIATED WITH WIRELESS NETWORK TRANSMITTING DEVICES

(75) Inventors: Vinay Sridhara, Santa Clara, CA (US); Saumitra Mohan Das, San Jose, CA (US); Ayman Fawzy Naguib, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 887 days.

(21) Appl. No.: 12/964,622

(22) Filed: Dec. 9, 2010

(65) Prior Publication Data

US 2011/0143683 A1    Jun. 16, 2011

Related U.S. Application Data

(60) Provisional application No. 61/285,845, filed on Dec. 11, 2009.

(51) Int. Cl.
| | |
|---|---|
| *H04B 17/00* | (2006.01) |
| *G01S 5/02* | (2010.01) |
| *H04L 1/00* | (2006.01) |
| *H04W 24/00* | (2009.01) |

(52) U.S. Cl.
CPC .......... *G01S 5/0215* (2013.01); *H04B 17/0042* (2013.01); *H04L 1/0026* (2013.01); *H04W 24/00* (2013.01); *G01S 5/0273* (2013.01)
USPC ................... 455/67.16; 455/67.11; 455/434; 370/338

(58) Field of Classification Search
CPC . H04W 24/00; H04B 17/0042; H04L 1/0026; G01S 5/0215; G01S 5/0273
USPC .......... 455/434, 296, 57.11, 67.16; 370/338, 370/334, 280, 347; 375/144; 343/795, 702, 343/846
See application file for complete search history.

(56) References Cited

U.S. PATENT DOCUMENTS

| | | | | |
|---|---|---|---|---|
| 5,926,133 | A * | 7/1999 | Green, Jr. ...................... | 342/363 |
| 8,050,243 | B2 * | 11/2011 | Ostergren ..................... | 370/338 |
| 8,068,802 | B2 * | 11/2011 | Bhattacharya et al. ........ | 455/231 |
| 8,233,906 | B2 * | 7/2012 | Nientiedt ...................... | 455/446 |
| 2002/0101912 | A1 * | 8/2002 | Phelts et al. .................. | 375/148 |
| 2005/0124368 | A1 * | 6/2005 | Diao et al. .................... | 455/522 |
| 2005/0140547 | A1 * | 6/2005 | Rosenfeld ..................... | 342/417 |

FOREIGN PATENT DOCUMENTS

| | | |
|---|---|---|
| EP | 1605725 A1 | 12/2005 |
| WO | 0128272 A1 | 4/2001 |
| WO | 03081277 A1 | 10/2003 |

OTHER PUBLICATIONS

International Search Report and Written Opinion—PCT/US2010/059957—ISA/EPO—Mar. 9, 2011.
Taiwan Search Report—TW099143309—TIPO—Jun. 14, 2013.

* cited by examiner

*Primary Examiner* — Mahendra Patel
(74) *Attorney, Agent, or Firm* — Arnold J. Gum

(57) ABSTRACT

Techniques are provided which may be implemented in various methods and/or apparatuses to allow a portable electronic device to characterize and/or otherwise identify that certain wireless signals may be multipath signals and/or non-multipath signals. Given such signal/environment characterization information, a portable electronic device may select particular wireless signals for use in signal-based location estimation process and/or other communication processes.

47 Claims, 3 Drawing Sheets

PORTABLE ELECTRONIC DEVICE POSITIONING BASED ON MULTIPATH CHARACTERIZATION INFORMATION ASSOCIATED WITH WIRELESS NETWORK TRANSMITTING DEVICES

CLAIM OF PRIORITY UNDER 35 U.S.C. §119

This application claims priority under 35 USC 119 to U.S. Provisional Application Ser. No. 61/285,845, filed Dec. 11, 2009, and entitled, "Multipath Characterization In Wireless Networks", which is assigned to the assignee hereof and which is incorporated herein by reference.

BACKGROUND

1. Field

The subject matter disclosed herein relates to portable electronic devices, and more particularly to methods and apparatuses for use in and/or with one or more portable electronic devices in a wireless operating environment.

2. Information

It is often useful to determine a position of a portable electronic device with reference to some location scheme. For example, some portable electronic devices may include a global positioning system (GPS) and/or other like global navigation satellite system (GNSS) receiver that is capable of determining a relative geographical position of the portable electronic device based on an applicable multiple signal-based position estimation process. For example, some portable electronic device, e.g., a mobile station, may be capable of estimating on its own or with network support, its relative location based on wireless signals received from wireless signal transmitting devices (e.g. base stations, access points, location beacons, etc.) using certain multiple signal-based position estimation processes.

There maybe situations, however, wherein some of the wireless signals that are received by a portable electronic device may not have traveled along a direct path from the transmitting device to the receiving device, but instead may have been reflected or otherwise directed along multiple paths leading from the transmitting antenna to the receiving antenna. Signals that have traveled along multiple paths may be referred to as multipath signals. Such multipath signals may decrease the effectiveness of certain location determination processes that are based, at least in part, on signal timing measurements and/or related distance determinations (e.g., multipath signals tend to travel a longer distance from a signaling device).

It would be beneficial for a portable electronic device to be able to differentiate between multipath and non-multipath (e.g., direct path) wireless signals that may be received and considered for processing as part of a signal-based location estimation process and/or other communication processes.

SUMMARY

In accordance with certain aspects, techniques are provided which may be implemented in various methods and/or apparatuses to allow a portable electronic device to characterize and/or otherwise identify that certain wireless signals may be multipath signals and/or non-multipath signals. Given such signal/environment characterization information, a portable electronic device may select particular wireless signals for use in signal-based location estimation process and/or other communication processes.

In accordance with an example implementation, a method may be provided which comprises: determining an expected distance between a portable electronic device and a wireless transmitting device based, at least in part, on an initial position of the portable electronic device and a position of the wireless transmitting device; determining an experienced distance between the portable electronic device and the wireless transmitting device based, at least in part, on at least one parameter associated with at least one wireless signal transmitted between the portable electronic device and the wireless transmitting device; and characterizing the wireless transmitting device as being at least one of a multipath source or a non-multipath source with respect to a current position of the portable electronic device based, at least in part, on the expected distance and the experienced.

In accordance with another example implementation, an apparatus may be provided which comprises: means for determining an expected distance between a portable electronic device and a wireless transmitting device based, at least in part, on an initial position of the portable electronic device and a position of the wireless transmitting device; means for determining an experienced distance between the portable electronic device and the wireless transmitting device based, at least in part, on at least one parameter associated with at least one wireless signal transmitted between the portable electronic device and the wireless transmitting device; and means for characterizing the wireless transmitting device as being at least one of a multipath source or a non-multipath source with respect to a current position of the portable electronic device based, at least in part, on the expected distance and the experienced distance.

In accordance with yet another example implementation, an apparatus for use in a portable electronic device may be provided. The apparatus may comprise memory, a wireless interface, and at least one processing unit. The at least one processing unit may be provided to: determine an expected distance between a portable electronic device and a wireless transmitting device based, at least in part, on an initial position of the portable electronic device and a position of the wireless transmitting device; determine an experienced distance between the portable electronic device and the wireless transmitting device based, at least in part, on at least one parameter associated with at least one wireless signal transmitted between the portable electronic device and the wireless transmitting device via the wireless interface; characterize the wireless transmitting device as being at least one of a multipath source or a non-multipath source with respect to a current position of the portable electronic device based, at least in part, on the expected distance and the experienced distance; and provide characterization information associated with at least the current position of the portable electronic device to the memory.

In accordance with still another example implementation, an article of manufacture may be provided which comprises a computer readable medium having stored thereon computer-executable instructions that are executable by one or more processing units of a portable electronic device to: determine the expected distance between a portable electronic device and a wireless transmitting device based, at least in part, on an initial position of the portable electronic device and a position of the wireless transmitting device; determine an experienced distance between the portable electronic device and the wireless transmitting device based, at least in part, on at least one parameter associated with at least one wireless signal transmitted between the portable electronic device and the wireless transmitting device; and characterize the wireless transmitting device as being at least one of a multipath source or a non-multipath source with respect to a current position of the portable electronic device based, at least in part, on the expected distance and the experienced distance.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
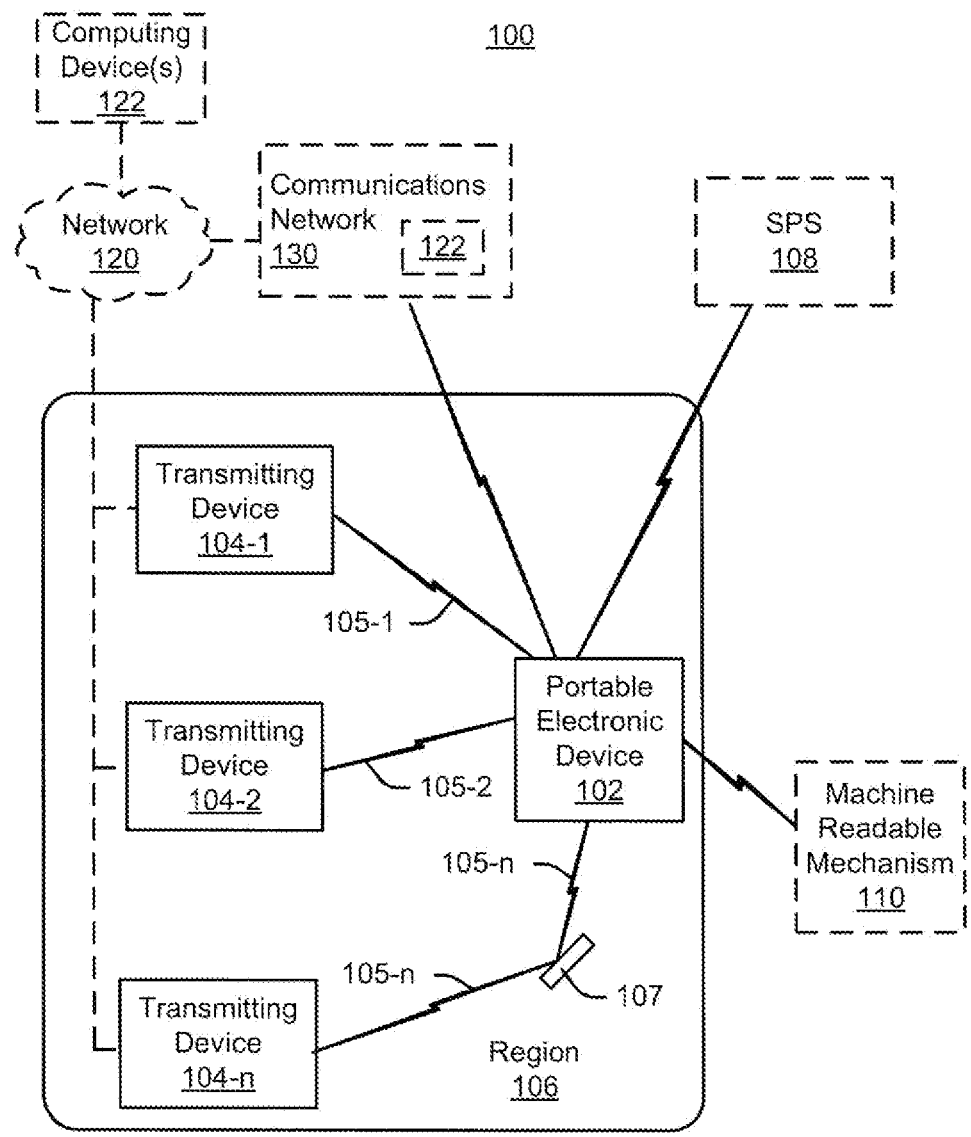
FIG. 1 is a schematic block diagram illustrating an operating environment which at times may present one or more multipath and/or non-multipath signals to a portable electronic device, in accordance with an example implementation.

In accordance with certain aspects of the present description, various techniques are provided which may be implemented in a portable electronic device to allow the device to characterize wireless transmitting devices as being either "multipath" devices or "non-multipath" devices with respect to a current estimated position or location of the portable electronic device.

For example, a portable electronic device may determine that a wireless transmitting device is a multipath device with respect to a current estimated position or location by determining that a wireless signal received from the wireless transmitting device is a multipath signal. Conversely, for example, a portable electronic device may determine that a wireless transmitting device is a multipath device with respect to a current estimated position or location by determining that a wireless signal received from the wireless transmitting device is a non-multipath signal. In certain example implementations herein, a process may include uploading information regarding that at a given relative (e.g., x-, y-coordinates, etc.) position certain access points and/or the like may have been deemed as "multipath" devices. Similarly, a process may include downloading similar information for a given locale, to learn which access points and/or the like may have been previously deemed as "multipath" devices (e.g., by one or more other devices).

With such a capability, a portable electronic device may be further capable of selecting particular wireless signals for use in signal-based location estimation process and/or other communication processes. For example, it may be beneficial to reduce or eliminate the use of certain multipath signals in certain processes. Also, it may be beneficial to select from among different processes depending on the characterization of the signals available for selection/use. For example, it may be beneficial to gather and share and/or disseminate certain characterization information using a plurality of portable electronic devices over a period of time and/or with regard to a region.

In accordance with an example method, a portable electronic device may be capable of determining an "expected" distance between an initial position of the portable electronic device and a position of a wireless transmitting device. Here, for example, an expected distance may be estimated based, at least in part, on a line of sight distance from a last known best position of the portable electronic device and a known or otherwise determined position of a transmitting antenna associated with the wireless transmitting device. By way of example by not limitation, an initial position (e.g., last known best position) of a portable electronic device may be determined based on information associated with a Satellite Positioning System (SPS), a location server, a recently accessed machine readable mechanism (MSM), certain user input(s), a directional sensor, a motion sensor, and/or the like. In certain example implementations, an expected distance may be calculated when the portable electronic device has been positioned accurately by some other capability, e.g., such as user input, etc.

In certain example implementations, an initial position may be estimated based, at least in part, on measured signal strength information associated with a wireless signal received by the portable electronic device from at least one wireless transmitting device. Here, for example, an initial position of a portable electronic device may be estimated to be the same or similar to a wireless transmitting device that is determined to be sufficiently nearby.

In certain implementations, an initial position of a wireless device may be provided to the portable electronic device in advance or as needed, for example, by one or more external devices (e.g., a location server, and/or the like). In certain implementations, for example, a user may provide inputs that may identify or otherwise reference in some manner an initial location, e.g., on screen perhaps while looking at a displayed map and/or other like elements.

Continuing with the example method, a portable electronic device may be capable of measuring or otherwise determining an "experienced" distance between it and a transmitting antenna associated with a wireless transmitting device. Here, for example, an experienced distance may be an estimated measurement based, at least in part, on one or more parameters associated with a received signal. For example, an experienced distance may be estimated based on parameters relating to a signal propagation time, a code and/or phase delay, or the like, associated with a received wireless signal. Here, for example, a propagation time may be associated with a round trip time (RTT) of a wireless signal transmitted by the portable electronic device to the wireless transmitting device, and transmitted back to the portable electronic device by the wireless transmitting device (e.g., with a known or otherwise determinable delay at the wireless transmitting device).

In certain examples, an "expected" distance and/or an "experienced" distance may comprise or otherwise relate to an estimated line-of-sight (LOS) distance between respective antennas of a portable electronic device and a wireless transmitting device. In certain examples, an "expected" distance and/or an "experienced" distance may comprise or otherwise relate to signal parameter time measurements that may be proportional to estimated linear distances between respective antennas of a portable electronic device and a wireless transmitting device.

Again continuing with the example method, a portable electronic device may be further capable of characterizing a wireless transmitting device as being at least one of a multipath source or a non-multipath source as associated with a current position of a portable electronic device based, at least in part, on an expected distance and an experienced distance. Here, for example, a wireless transmitting device may be characterized as a multipath source upon determining that its corresponding experienced distance exceeds its corresponding expected distance (or the sum of such expected distance and a distance error threshold value).

Continuing still with the example method, a portable electronic device may be further capable of storing one or more electronic signals representing characterization information associated with at least a current position. By way of certain examples but not limitation, characterization information may include information relating to one or more of: a wireless transmitting device identifier, a position/location of the wireless transmitting device, an expected distance, an experienced distance, a distance error threshold value, various wireless signal information, other information associated with the wireless transmitting device, a date and/or time, an initial position/location of the wireless electronic device, a current estimated location of the wireless electronic device, other information associated with the portable electronic device, etc.

In certain further example implementations, a portable electronic device may be further capable of determining its current estimated location of based, at least in part, on at least a portion of the characterization information. Here, for example, a current estimated location may be based, at least in part, on wireless signals received from a plurality of wireless transmitting devices, wherein each of the plurality of wireless transmitting devices is characterized (for a current position) as being transmitted by non-multipath sources. In other example implementations, at least one of the plurality of wireless transmitting devices may be characterized (for the current position) as being transmitted by multipath source.

In certain further example implementations, a portable electronic device may be further capable of transmitting at least a portion of the characterization information to at least one external computing device and/or receiving at least a portion of the characterization information from at least one external computing device.

Reference is now made to FIG. 1, which is a schematic block diagram illustrating an operating environment 100, in accordance with certain example implementations. As shown, an operating environment 100 may, for example, include one or more wireless transmitting devices 104 (shown as 104-1, 104-2, . . . , 104-n) operatively arranged within and/or otherwise about a region 106. Region 106 may, for example, represent a one or more buildings or other like structures and/or portion(s) thereof. Region 106 may, for example, represent a campus comprising various buildings, open areas, pathways, streets, etc., and/or portion(s) thereof. These are but a few examples of a region and claimed subject matter is not necessarily so limited. Region 106 may, for example, be simply related to a service or coverage area associated with all or part of operating environment 100 and/ or in particular reference to one or more wireless transmitting devices 104.

Wireless signal transmitting devices 104 may all be the same type of device, and/or represent different types of devices depending on the situation. By way of non-limiting example, one or more wireless transmitting devices 104 may include wireless network access points and/or other like devices which may not only transmit wireless signals but may also receive wireless signals. For example, wireless transmitting devices 104-1, 104-2 and 104-n in FIG. 1 may comprise wireless access points which are also coupled to a network 120 and/or other communication and/or computing resources. Network 120 may, therefore, represent one or more communication and/or computing networks, services, resources, etc. In certain example implementations, network 120 (which may be optional) may include the Internet and/or other like computing and/or communication infrastructures.

As illustrated, network 120 may be coupled to one or more computing devices 122, and/or a communications network 130 (possibly having or providing access to one or more computing devices 122). Communications network (which may be optional) may include, for example, a cellular and/or other like wireless telecommunications system(s)/network (s).

Operating environment 100 may include an SPS 108. For example, SPS 108 may include one or more GNSS and/or other like navigation systems that may transmit SPS signals that may be received by portable electronic device 102 (e.g., with an SPS receiver).

Operating environment 100 may include a machine readable mechanism (MRM) 110 that may be operatively "accessed" by portable electronic device 102. For example, MRM 110 may include one or more optically readable objects (e.g., a QC code, a bar code, and/or the like) that a camera or other like scanning device of portable electronic device 102 may read information from MRM 110. In other examples, MRM 110 may include one or more electronically readable objects (e.g., an RFID device, and/or the like) that may be operatively "accessed" by portable electronic device 102, for example, using an RFID scanner, and/or other like device. The information from an MRM 110 may, for example, comprise position and/or location information associated with the MRM, and/or identify where such position and/or location information associated with the MRM may be accessed (e.g., a server device, etc.).

As such, SPS 108 and/or MRM 110 may be used to identify an initial position of portable electronic device 102 and/or provide or otherwise identify information based, at least in part, upon which an initial position of portable electronic device 102 may be determined.

As illustrated by the lightening bolt shaped lines in FIG. 1, the various wireless transmitting devices 104 and (optional) communications network 130, SPS 108, and/or (certain) MRM 110 may be capable of transmitting wireless signals that may be received by a portable electronic device 102. More specifically, FIG. 1 graphically illustrates some example non-multipath sources and a multipath source as may be determined and characterized by portable electronic device 102 at it current position. As graphically illustrated, wireless signals 105-1 and 105-2 travel direct paths from wireless transmitting devices 104-1 and 104-2, respectively, to portable electronic device 102. Hence, the distance traveled by wireless signal 105-1 (e.g., an experienced distance) should be close to or matching a LOS distance (or, e.g., within a distance error threshold value of an expected distance) between the respective antennas of wireless transmitting device 104-1 and portable electronic device 102. Hence, in this example, wireless transmitting devices 104-1 may be characterized as non-multipath sources for the current position of portable electronic device 102. Similarly, in this example, wireless transmitting devices 104-2 may also be characterized as non-multipath sources for the current position of portable electronic device 102.

As graphically illustrated, wireless signal 105-n travels along at least two paths from wireless transmitting devices 104-n to portable electronic device 102. Here, for example, an object 107 present and surface, feature, and/or have some other property which leads wireless signal 105-n to take at least a second path on its way to portable electronic device 102. Hence, the distance traveled by wireless signal 105-n (e.g., an experienced distance) over its multipath course should be greater than a LOS distance (or, e.g., may exceed a distance error threshold value of an expected distance) between the respective antennas of wireless transmitting device 104-n and portable electronic device 102. Hence, wireless transmitting device 104-n may be characterized as a multipath source for the current position of portable electronic device 102.

Thus, as described in greater detail in the further examples below, it may be beneficial for portable electronic device to be able to differentiate between multipath and non-multipath sources. Here, for example, it may be beneficial to certain types of processes to not use wireless signals from wireless transmitting device 104-n while at or near the current position. Moreover, once characterized information is available for the current position and/or better yet a corresponding current estimated location of portable electronic device 102, then other portable electronic devices may be able to take advantage of such information should they become positioned at or near such current position/location. Here, for example, one or more computing devices 122 may gather, compile, further process/refine such characterization information and provide all or portions thereof to one or more other devices, services, etc.

Figure 2:
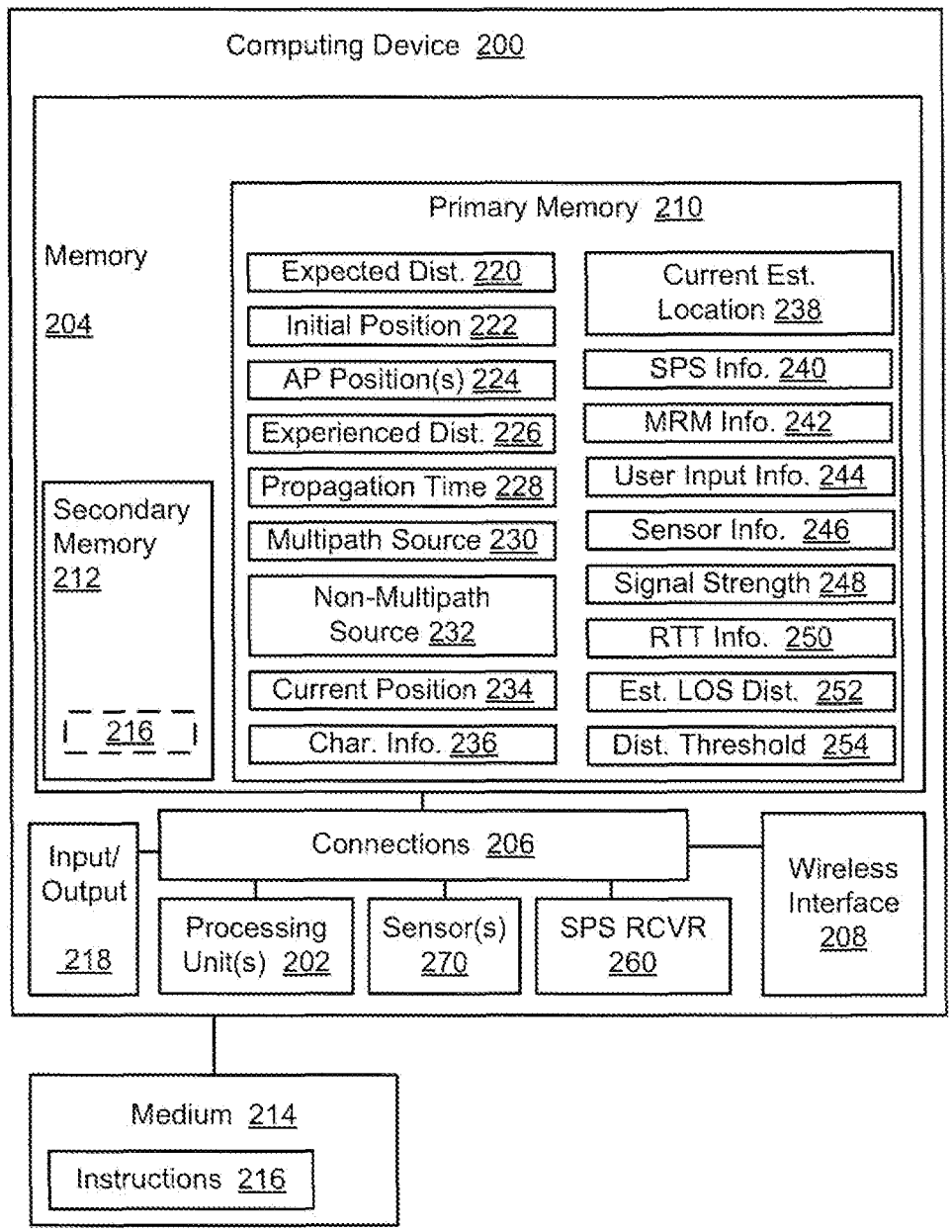
FIG. 2 is a schematic block diagram illustrating certain features of a portable electronic device for use within an operating environment, for example, as shown in FIG. 1, in accordance with an implementation.

Reference is made next to FIG. 2, which is a schematic block diagram illustrating some features of a portable electronic device 102 comprising a computing device 200 in accordance with certain example implementations.

As shown, computing device 200 may include one or more processing units 202 and memory 204, which may be operatively coupled together via one more connections 206. Computing device 200 may also include one or more wireless interfaces 208 to receive and/or transmit wireless signals, for example, using one or more antennas (not shown). Computing device 200 may further include one or more input and/or output mechanisms 218 and/or other like arrangements, which may be used to convey information to and/or receive information (user input) from a user. Computing device 200 may also include an SPS receiver 260, and/or one or more sensors 270. As illustrated, connections 206 may also operatively couple wireless interface 208 and/or input/output mechanisms 218, SPS receiver 260, and/or sensor(s) 270 to one or both of processing unit(s) 202 and/or memory 204.

As further illustrated in FIG. 2 an article of manufacture, represented here by a computer readable medium 214, may be provided and accessed by processing unit(s) 202, for example. As such, in certain example implementations, the methods and/or apparatuses may take the form in whole or part of a computer readable medium 214 that includes computer implementable instructions 216 stored thereon, which if executed by at least one processing unit or other like circuitry enable the processing unit(s) 202 and/or the other like circuitry to perform all or portions of the techniques/processes as presented in the examples herein. Computer readable medium 214 may be representative of any data storage mechanism.

Processing unit(s) 202 may be implemented in hardware or a combination of hardware and software. Processing unit(s) 202 may be representative of one or more circuits configurable to perform at least a portion of a data computing procedure or process. By way of example but not limitation, processing unit(s) 202 may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 210 and/or a secondary memory 212. Primary memory 210 may include, for example, a random access memory, read only memory, etc. While illustrated in this example as being separate from processing unit(s) 202, it should be understood that at least a portion of a primary memory 210 may, for example, be provided within or otherwise co-located/coupled with processing unit(s) 202. Secondary memory 212 may, for example, include the same or similar type of memory as primary memory 210 and/or one or more data storage devices or systems, such as, for example, a disk drive, an optical disc drive, a tape drive, a solid state memory drive, a smart card, etc. In certain implementations, secondary memory 212 may be operatively receptive of, or otherwise configurable to couple to, computer readable medium 214.

Connections 206 are representative of one or more buses, lines, conductors, fibers, etc., that operatively couple the various circuits together and carry one or more electrical and/or other like signals there between.

Input/output mechanism(s) 218 may, for example, include a keyboard; a keypad, a button, a touch screen, a pointer mechanism, a microphone, a camera, a motion sensor, a display, a speaker, a projector, an MRM interface (e.g., scanner, transceiver, etc.) and/or other like arrangements. Sensors 270 may, for example, include one or more directional sensors (e.g., a magnetometer, compass, etc.), and/or one or more motion sensors (e.g., an accelerometer, a barometer, etc.).

Wireless interface 208 may, for example, be capable of supporting one or more computing and communication services, such as, for example, telecommunication services, location/navigation services, and/or other like information and/or services with regard to portable electronic device 102. In certain example implementations, portable electronic device 102 may include a mobile station (MS) such as a cellular phone, a smart phone, a personal digital assistant, a portable computing device, a navigation unit, and/or the like or any combination thereof. In other example implementations, portable electronic device 102 may take the form of one or more integrated circuits, circuit boards, and/or the like that may be operatively enabled for use in another device.

With such examples and others in mind, wireless interface 208 may, for example, be enabled for use with various wireless communication networks and/or technologies such as a wireless wide area network (WWAN), a wireless local area network (WLAN), a wireless personal area network (WPAN), and so on. The term "network" and "system" may be used interchangeably herein. A WWAN may comprise a Code Division Multiple Access (CDMA) network or technology, a Time Division Multiple Access (TDMA) network or technology, a Frequency Division Multiple Access (FDMA) network or technology, an Orthogonal Frequency Division Multiple Access (OFDMA) network or technology, a Single-Carrier Frequency Division Multiple Access (SC-FDMA) network or technology, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, certain example networks may comprise a plurality of different communication technologies.

As further illustrated in FIG. 2, in certain situations and/or at certain times, primary memory 210 may have stored therein data as provided by one or more electrical signals representing one or more of: an expected distance 220; an initial position 222; AP position(s) 224, e.g., information identifying position(s) of wireless transmitting device(s); an experienced distance 226, a propagation time 228; a multipath source 230; a non-multipath source 232; a current position 234; characterization information 236; a current estimated location 238; SPS information 240, MRM information 242, user input information 244; sensor information 246; signal strength 248, e.g., relating to at least one wireless signal transmitted from a nearby wireless transmitting device; RTT information 250; an estimated LOS distance 252; and/or, a distance error threshold value 254. Secondary memory 212 may also store the same or similar information as primary memory 210 and also all or part of computer-executable instructions 216.

Figure 3:
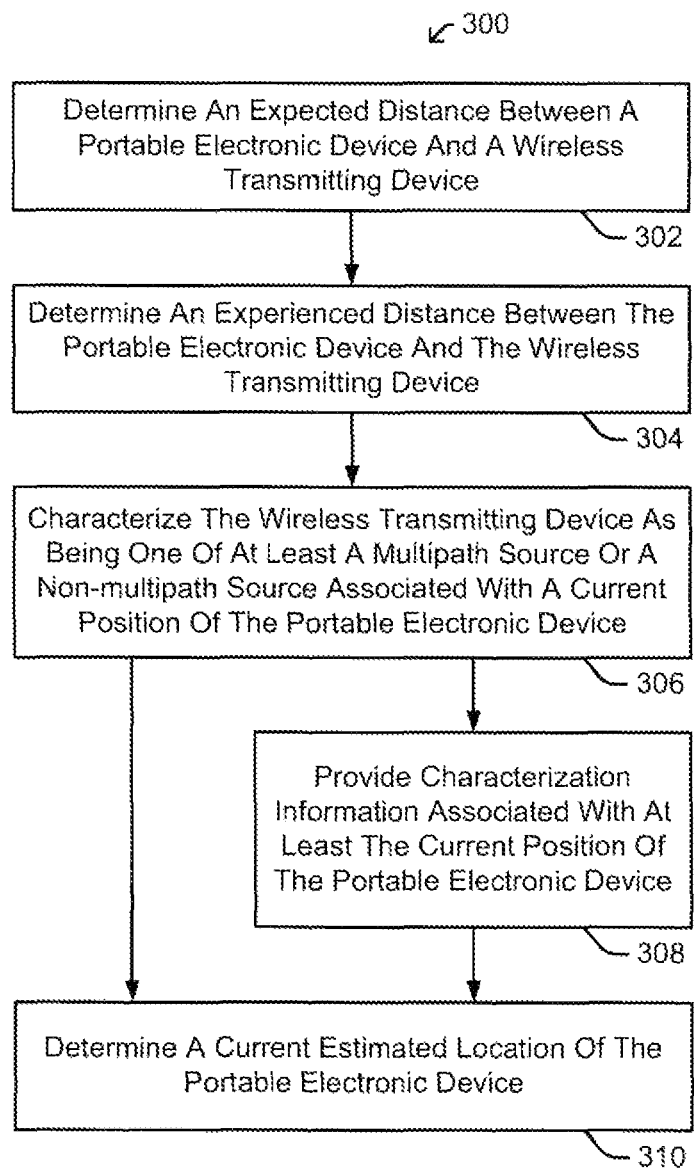
FIG. 3 is a functional flow diagram illustrating certain features of a process for use in an operating environment, for example, as shown in FIG. 1, in accordance with an implementation.

Attention is drawn next to FIG. 3, which is a flow diagram illustrating a process 300 that may be implemented in a portable electronic device 102, e.g., as in FIG. 1 and/or FIG. 2, in accordance with certain example implementations.

At block 302, an expected distance between a portable electronic device and a wireless transmitting device may be determined. In certain example implementations, an expected distance between a portable electronic device and a wireless transmitting device may be determined based, at least in part, on an initial position of the portable electronic device and a position of the wireless transmitting device. Here, an initial position of the portable electronic device may be obtained, for example, based on information associated with an SPS, a location server, a MRM, user input(s), and/or the like. In certain examples, an initial position of the portable electronic device may be determined based, at least in part, on a strength (e.g., received signal strength indicator (RSSI), or the like) of at least one wireless signal transmitted from at least one wireless transmitting device. In certain examples, an initial position of the portable electronic device may be determined based, at least in part, on information associated with one or more sensors (e.g., directional and/or motion sensor(s)). In still other examples, information identifying at least the position of at least one wireless transmitting device may be obtained, e.g., from an external computing device.

At block 304, an experienced distance between the portable electronic device and the wireless transmitting device may be determined. In certain example implementations, an experienced distance between a portable electronic device and a wireless transmitting device may be determined based, at least in part, on a propagation time (and/or other parameter, e.g., code/phase delay or shift, etc.) associated with at least one wireless signal transmitted between the portable electronic device and the wireless transmitting device. For example, a propagation time associated with the at least one wireless signal transmitted between the portable electronic device and the wireless transmitting device may be associated with a RTT measured or otherwise obtained by the portable electronic.

At block 306, the wireless transmitting device may be characterized as being at least one of a multipath source or a non-multipath source with respect to a current position of the portable electronic device. In certain example implementations, a wireless transmitting device may be characterized as being at least one of a "multipath" source or a "non-multipath" source with respect to a current position of the portable electronic device based, at least in part, on a difference between an expected distance and an experienced distance. Thus, for example, if such difference is greater than a distance error threshold value, then such wireless transmitting device may be characterized as being a "multipath" source. Conversely, if such a difference is less than or equal to a distance error threshold value, then such wireless transmitting device may be characterized as being a "non-multipath" source.

Thus, in other words, for example, an experienced distance may be compared to a sum of an expected distance and (plus or minus) a distance error threshold value. Thus, for example, if an experienced distance exceeds a sum of an expected distance and a (plus) distance error threshold value then the corresponding wireless transmitting device may be characterized as a "multipath" source at the current position of the portable electronic device. Conversely, if an experienced distance does not exceed a sum of an expected distance and a (plus) distance error threshold value then the corresponding wireless transmitting device may be characterized as a non-multipath source at the current position of the portable electronic device.

A (plus and/or minus) distance error threshold value may, for example, be set in advance or be dynamically determined in some manner. In certain implementations, different distance error threshold values may be employed for use in different regions, or other variations in the operating environments and/or devices operating therein.

At block 308, which may be optional, characterization information associated with at least the current position of the portable electronic device may be stored in memory and/or provided to one or more external devices.

As illustrated, process 300 may proceed from either block 306 or block 308 to block 310. At block 310, a current estimated location of the portable electronic device may be determined. In certain example implementations, a current estimated location of the portable electronic device may be determined based, at least in part, on at least a portion of the characterization information. Here, for example, a current estimated location of the portable electronic device may be based, at least in part, on signals from a plurality of "non-multipath" sources associated with the current position. In other examples, a current estimated location of the portable electronic device may be based, at least in part, on at least one signal received from at least one "multipath" source associated with the current position. In certain implementations, such characterization information may be determined by the portable electronic device. In certain other implementations, at least a portion of the characterization information may be received from one or more external computing devices.

It should be observed that a value for the various distances as provided herein may be expressed in units of either linear length or time, and that conversion between units is well known. Accordingly, it should be understood that as used herein the term "distance" and other related values may be implemented in either units of time or linear length without deviating from claimed subject matter.

Thus, as illustrated in the examples presented herein, a method may be provided for a portable electronic device to determine an experienced distance to a wireless transmitting device based, at least in part, on at least one parameter associated with at least one wireless signal transmitted between the portable electronic device and the wireless transmitting device. The method may include characterizing the wireless transmitting device as being at least one of a multipath source or a non-multipath source with respect to a current position of the portable electronic device based, at least in part, on the expected distance and the experienced distance.

In certain example implementations, a method may further include determining the expected distance based, at least in part, on an initial position of the portable electronic device and a position of the wireless transmitting device, and/or storing characterization information associated with at least the current position of the portable electronic device.

In certain implementations, a parameter associated with at least one wireless signal may comprise, for example, propagation time, a code delay or shift, a phase delay or shift, and/or the like.

In certain example implementations, a method may further include determining a current estimated location based, at least in part, on at least a portion of the characterization information. For example, a method may include determining a current estimated location based, at least in part, on wireless signals received from a plurality of wireless transmitting devices, wherein at least two of the plurality of wireless transmitting devices have been characterized through corresponding characterization information as being non-multipath sources with respect to the current position. In other examples, a method may include determining a current estimated location based, at least in part, on wireless signals received from a plurality of wireless transmitting devices, wherein at least one of the plurality of wireless transmitting devices has been characterized through corresponding characterization information as being a multipath source with respect to the current position.

In certain implementations, for example, a method may include transmitting at least a portion of the characterization information to at least one external computing device and/or receiving at least a portion of the characterization information from at least one other computing device.

In certain example implementations, a method may include obtaining an initial position based on information associated with a Satellite Positioning System (SPS), a location server, a machine readable mechanism, user input, and/or the like or any combination thereof. For example, a method may include determining an initial position based, at least in part, on a strength of at least one wireless signal transmitted from at least one wireless transmitting device. For example, a method may include determining an initial position based, at least in part, on information associated with at least one of a directional sensor and/or a motion sensor.

In certain example implementations, a method may further include obtaining information identifying at least the position of at least the wireless transmitting device.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "generating", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
   determining an expected distance between a portable electronic device and a wireless transmitting device based, at least in part, on an initial position of said portable electronic device and a position of said wireless transmitting device;
   determining an experienced distance between said portable electronic device and said wireless transmitting device based, at least in part, on at least one parameter associated with at least one wireless signal transmitted between said portable electronic device and said wireless transmitting device, wherein said at least one parameter associated with said at least one wireless signal comprises at least one of: a propagation time, a code delay or shift, or a phase delay or shift;
   characterizing said wireless transmitting device as being at least one of a multipath source or a non-multipath source with respect to a current position of said portable electronic device based, at least in part, on said expected distance and said experienced distance;
   storing one or more electronic signals representing characterization information associated with at least said current position of said portable electronic device; and
   determining a current estimated location of said portable electronic device based, at least in part, on wireless signals received from a plurality of wireless transmitting devices, wherein at least one of said plurality of wireless transmitting devices has been characterized through corresponding characterization information as being said multipath source with respect to said current position.

2. The method as recited in claim 1, wherein at least two of said plurality of wireless transmitting devices have been characterized through corresponding characterization information as being said non-multipath sources with respect to said current position.

3. The method as recited in claim 1, further comprising:
   transmitting at least a portion of characterization information associated with at least said current position of said portable electronic device to at least one external computing device.

4. The method as recited in claim 1, further comprising:
   receiving at least a portion of characterization information associated with at least said current position of said portable electronic device from at least one external computing device.

5. The method as recited in claim 1, further comprising:
   obtaining said initial position of said portable electronic device based on information associated with at least one of: a Satellite Positioning System (SPS); a location server, a machine readable mechanism; or a user input.

6. The method as recited in claim 1, further comprising:
   determining said initial position of said portable electronic device based, at least in part, on a strength of at least one wireless signal transmitted from at least one wireless transmitting device.

7. The method as recited in claim 1, further comprising:
   determining said initial position of said portable electronic device based, at least in part, on information associated with at least one of: a directional sensor or a motion sensor.

8. The method as recited in claim 1, further comprising:
   obtaining information identifying at least a position of at least said wireless transmitting device.

9. The method as recited in claim 1, wherein said propagation time comprises a round trip time.

10. The method as recited in claim 1, wherein at least one of: said expected distance or said experienced distance comprises an estimated line-of-sight distance between said portable electronic device and said wireless transmitting device.

11. The method as recited in claim 1, further comprising:
    characterizing said wireless transmitting device based further, at least in part, on a distance error threshold value.

12. The method as recited in claim 1, further comprising:
    characterizing said wireless transmitting device as being said multipath source associated with said current position of said portable electronic device based, at least in part, on a distance error threshold value.

13. An apparatus comprising:
    means for determining an expected distance between a portable electronic device and a wireless transmitting device based, at least in part, on an initial position of said portable electronic device and a position of said wireless transmitting device;
    means for determining an experienced distance between said portable electronic device and said wireless transmitting device based, at least in part, on at least one parameter associated with at least one wireless signal transmitted between said portable electronic device and said wireless transmitting device, wherein said at least one parameter associated with said at least one wireless signal comprises at least one of: a propagation time, a code delay or shift, or a phase delay or shift;
    means for characterizing said wireless transmitting device as being at least one of a multipath source or a non-multipath source with respect to a current position of said portable electronic device based, at least in part, on said expected distance and said experienced distance;
    means for storing one or more electronic signals representing characterization information associated with at least said current position of said portable electronic device: and
    means for determining a current estimated location of said portable electronic device based, at least in part, on wireless signals received from a plurality of wireless transmitting devices, wherein at least one of said plurality of wireless transmitting devices has been characterized through corresponding characterization information as being said multipath source with respect to said current position.

14. The apparatus as recited in claim 13,
    wherein at least two of said plurality of wireless transmitting devices have been characterized through corresponding characterization information as being said non-multipath sources with respect to said current position.

15. The apparatus as recited in claim 13, further comprising:
    means for transmitting at least a portion of characterization information associated with at least said current position of said portable electronic device to at least one external computing device.

16. The apparatus as recited in claim 13, further comprising:
    means for receiving at least a portion of characterization information associated with at least said current position of said portable electronic device from at least one external computing device.

17. The apparatus as recited in claim 13, further comprising:
means for obtaining said initial position of said portable electronic device based on information associated with at least one of: a Satellite Positioning System (SPS); a location server, a machine readable mechanism; or a user input.

18. The apparatus as recited in claim 13, further comprising:
means for determining said initial position of said portable electronic device based, at least in part, on a strength of at least one wireless signal transmitted from at least one wireless transmitting device.

19. The apparatus as recited in claim 13, further comprising:
means for determining said initial position of said portable electronic device based, at least in part, on information associated with at least one of: a directional sensor, or a motion sensor.

20. The apparatus as recited in claim 13, further comprising:
means for obtaining information identifying at least a position of at least said wireless transmitting device.

21. The apparatus as recited in claim 13, wherein said propagation time comprises a round trip time.

22. The apparatus as recited in claim 13, wherein at least one of: said expected distance, or said experienced distance comprises an estimated line-of-sight distance between said portable electronic device and said wireless transmitting device.

23. The apparatus as recited in claim 13, further comprising:
means for characterizing said wireless transmitting device based further, at least in part, on a distance error threshold value.

24. The apparatus as recited in claim 13, further comprising:
means for characterizing said wireless transmitting device as being said multipath source associated with said current position of said portable electronic device based, at least in part, on a distance error threshold value.

25. An apparatus for use in a portable electronic device, the apparatus comprising:
memory;
a wireless interface; and
at least one processing unit to:
determine an expected distance between said portable electronic device and a wireless transmitting device based, at least in part, on an initial position of said portable electronic device and a position of said wireless transmitting device, wherein said at least one parameter associated with said at least one wireless signal comprises at least one of: a propagation time, a code delay or shift, or a phase delay or shift;
determine an experienced distance between said portable electronic device and said wireless transmitting device based, at least in part, on at least one parameter associated with at least one wireless signal transmitted between said portable electronic device and said wireless transmitting device via said wireless interface;
characterize said wireless transmitting device as being at least one of a multipath source or a non-multipath source with respect to a current position of said portable electronic device based, at least in part, on said expected distance and said experienced distance;
store one or more electronic signals representing characterization information associated with at least said current position of said portable electronic device to said memory; and
determine a current estimated location of said portable electronic device based, at least in part, on wireless signals received from a plurality of wireless transmitting devices, wherein at least one of said plurality of wireless transmitting devices has been characterized through corresponding characterization information as being said multipath source with respect to said current position.

26. The apparatus as recited in claim 25,
wherein at least one of said plurality of wireless transmitting devices has been characterized through corresponding characterization information as being said multipath source with respect to said current position.

27. The apparatus as recited in claim 25, said at least one processing unit to further:
obtain at least a portion of said characterization information from at least one external computing device via said wireless interface.

28. The apparatus as recited in claim 25, said at least one processing unit to further:
obtain said initial position of said portable electronic device based on information associated with at least one of: a Satellite Positioning System (SPS); a location server, a machine readable mechanism; or a user input.

29. The apparatus as recited in claim 25, said at least one processing unit to further:
determine said initial position of said portable electronic device based, at least in part, on a strength of at least one wireless signal received via said wireless interface from at least one wireless transmitting device.

30. The apparatus as recited in claim 25, said at least one processing unit to further:
determine said initial position of said portable electronic device based, at least in part, on information associated with at least one of: a directional sensor, or a motion sensor.

31. The apparatus as recited in claim 25, said at least one processing unit to further:
obtain information identifying at least a position of at least said wireless transmitting device from at least one of: said memory, or said wireless interface.

32. The apparatus as recited in claim 25, wherein said propagation time comprises a round trip time.

33. The apparatus as recited in claim 25, wherein at least one of: said expected distance, or said experienced distance comprises an estimated line-of-sight distance between said portable electronic device and said wireless transmitting device.

34. The apparatus as recited in claim 25, said at least one processing unit to further:
characterize said wireless transmitting device based further, at least in part, on a distance error threshold value.

35. The apparatus as recited in claim 25, said at least one processing unit to further:
characterize said wireless transmitting device as being said multipath source associated with said current position of said portable electronic device based, at least in part, on a distance error threshold value.

36. An article comprising:
a non-transitory computer readable medium having stored thereon computer-executable instructions being executable by one or more processing units of a portable electronic device to:

determine an expected distance between said portable electronic device and a wireless transmitting device based, at least in part, on an initial position of said portable electronic device and a position of said wireless transmitting device, wherein said at least one parameter associated with said at least one wireless signal comprises at least one of: a propagation time, a code delay or shift, or a phase delay or shift;

determine an experienced distance between said portable electronic device and said wireless transmitting device based, at least in part, on at least one parameter associated with at least one wireless signal transmitted between said portable electronic device and said wireless transmitting device;

characterize said wireless transmitting device as being at least one of a multipath source or a non-multipath source with respect to a current position of said portable electronic device based, at least in part, on said expected distance and said experienced distance;

store characterization information associated with at least said current position of said portable electronic device; and determine a current estimated location of said portable electronic device based, at least in part. on wireless signals received from a plurality of wireless transmitting devices, wherein at least one of said plurality of wireless transmitting devices has been characterized through corresponding characterization information as being said multipath source with respect to said current position.

37. The article as recited in claim 36, wherein at least two of said plurality of wireless transmitting devices have been characterized through corresponding characterization information as being said non-multipath sources with respect to said current position.

38. The article as recited in claim 36, said computer-executable instructions being executable by one or more processing units to further:
initiate transmission of at least a portion of characterization information associated with at least said current position of said portable electronic device to at least one external computing device.

39. The article as recited in claim 36, said computer-executable instructions being executable by one or more processing units to further:
obtain at least a portion of characterization information associated with at least said current position of said portable electronic device from at least one external computing device.

40. The article as recited in claim 36, said computer-executable instructions being executable by one or more processing units to further:
obtain said initial position of said portable electronic device based on information associated with at least one of: a Satellite Positioning System (SPS); a location server, a machine readable mechanism; or a user input.

41. The article as recited in claim 36, said computer-executable instructions being executable by one or more processing units to further:
determine said initial position of said portable electronic device based, at least in part, on a strength of at least one wireless signal transmitted by at least one nearby wireless transmitting device.

42. The article as recited in claim 36, said computer-executable instructions being executable by one or more processing units to further:
determine said initial position of said portable electronic device based, at least in part, on information associated with at least one of: a directional sensor or a motion sensor.

43. The article as recited in claim 36, said computer-executable instructions being executable by one or more processing units to further:
obtain information identifying at least a position of at least said wireless transmitting device.

44. The article as recited in claim 36, wherein said propagation time comprises a round trip time.

45. The article as recited in claim 36, wherein at least one of: said expected distance or said experienced distance comprises an estimated line-of-sight distance between said portable electronic device and said wireless transmitting device.

46. The article as recited in claim 36, said computer-executable instructions being executable by one or more processing units to further:
characterize said wireless transmitting device based further, at least in part, on a distance error threshold value.

47. The article as recited in claim 36, said computer-executable instructions being executable by one or more processing units to further:
characterize said wireless transmitting device as being said multipath source associated with said current position of said portable electronic device based, at least in part, on a distance error threshold value.

* * * * *